E. M. REED.
RAKE.
APPLICATION FILED FEB. 16, 1916.
1,187,176.
Patented June 13, 1916.
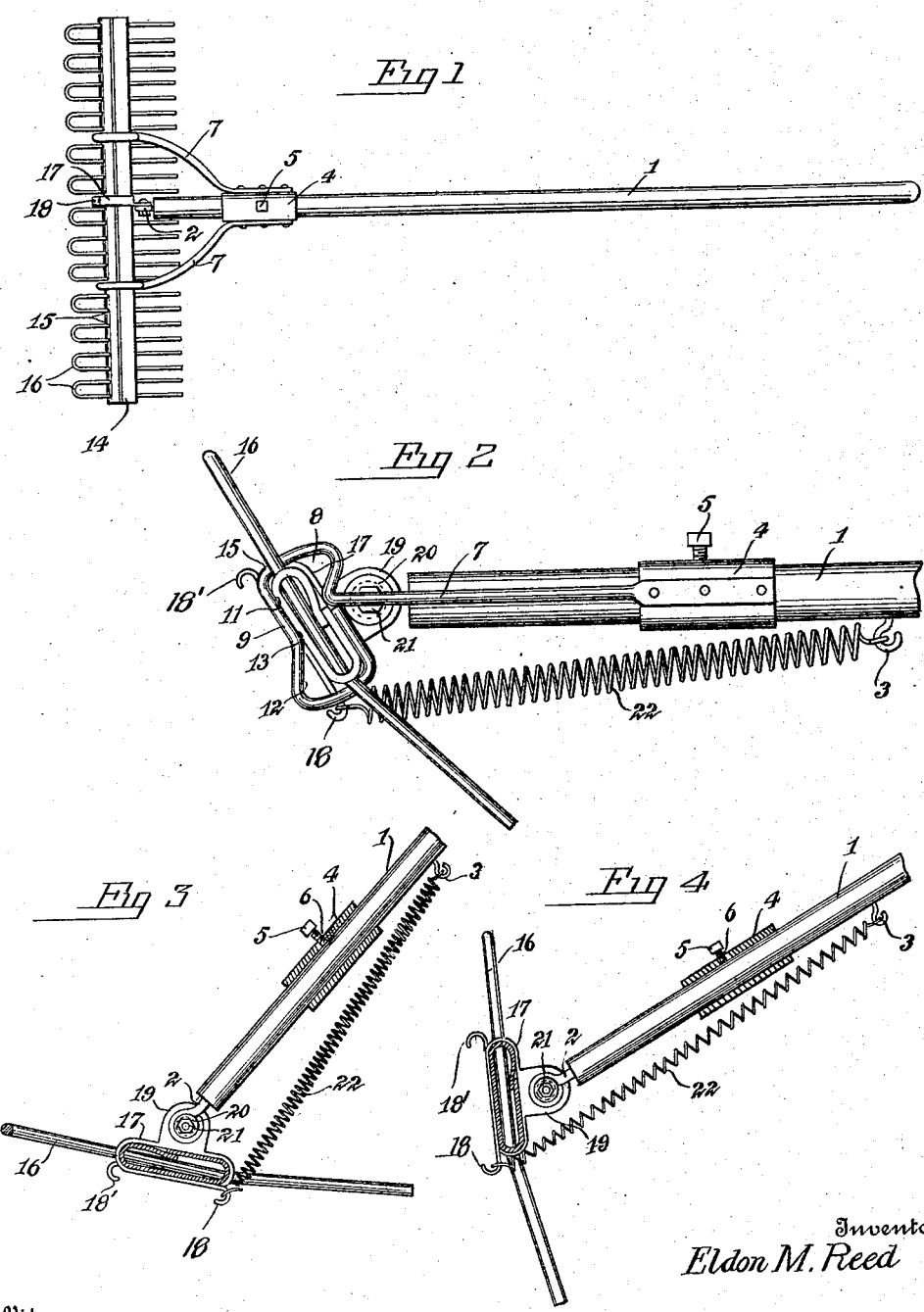
Witnesses
F. Windridge
F. Hough
Inventor
Eldon M. Reed
By Victor J. Evans
Attorney

UNITED STATES PATENT OFFICE.

ELDON M. REED, OF BENTON, ILLINOIS.

RAKE.

1,187,176.  Specification of Letters Patent.  Patented June 13, 1916.

Application filed February 16, 1916. Serial No. 78,684.

*To all whom it may concern:*

Be it known that I, ELDON M. REED, a citizen of the United States, residing at Benton, in the county of Franklin and State of Illinois, have invented new and useful Improvements in Rakes, of which the following is a specification.

This invention relates to rakes designed primarily for use in collecting the accumulated material on lawns and in gardens although its improved construction enables the rake to be advantageously used in other places when found desirable.

The primary object of the invention is to provide a rake having a head turnably connected with the handle and held in an inclined position with relation to the handle by a flexible member connected with the head and handle whereby when the head is removed from engagement with the earth the accumulated material adhering between the teeth of the rake may be removed by sliding the head of the rake along the surface to be cleaned in the opposite direction from the person manipulating the rake.

Another object of the invention is to provide a novel supporting member for the rake head by which the rake head is connected with the handle, said member also serving to limit the turning movement of the rake head under the influence of a spring connected with the head and handle.

Another object of the invention is to provide the device with a sleeve which receives the rake handle and is provided with head supporting arms said sleeves being movably and turnably mounted upon the handle to permit the rake head to be reversed and maintained in an inclined position with relation to the handle by means of a resilient element connected with the head and handle.

With these and other objects in view the invention resides in the novel combination and arrangement of parts which will be hereinafter described and particularly pointed out in the claims.

The preferred embodiment of the invention has been illustrated in the accompanying drawing although no restriction is necessarily made to the precise details of construction therein shown, as changes, alterations and modifications within the scope of the claims may be resorted to when desired.

In the drawing:—Figure 1 is a top plan view of a rake constructed in accordance with the invention. Fig. 2 is a side elevation of the same, a portion of the handle being broken away to show the head and supporting arms connected therewith upon a larger scale. Fig. 3 is a longitudinal sectional view through the rake head, the sleeve upon the handle also being shown in section and the teeth carried by the rake head arranged upon the ground in such a manner that material which is accumulated between the teeth may be removed therefrom by sliding the head along the ground. Fig. 4 is a view similar to Fig. 3 showing the position of the head when the rake is in use.

Like characters of reference denote corresponding parts throughout the several views in the drawing.

Referring now to the drawing in detail, the numeral 1 designates the rake handle which may be of the type now in common use and has removably connected to one end thereof a screw eye 2, said handle being further provided near the last mentioned end with a hook 3, the shank of which is threadedly connected with the handle. A sleeve 4 is slidably mounted on the handle 1 between the screw eye 2 and the hook 3, said sleeve being held against longitudinal movement on the handle by means of a set screw 5 threadedly engaged with an opening 6 in the sleeve and having one end bearing upon the handle. Spaced arms 7 project beyond one end of the sleeve and have their free end provided with openings 8, the side walls of which converge toward a point between the top and bottom of said openings, as indicated by the numeral 9 and provide stop shoulders 11 and 12 arranged respectively above and below the converging points of the side walls. The top and bottom of the openings 8 are curved in opposite directions to provide bearing surfaces 13 for the head of the rake.

The rake head designated by the numeral 14 is preferably formed from a strip of relatively stiff material folded upon itself adjacent each side edge with the free edges of the folded portions over-lying and secured in any suitable manner. Each side edge of the rake head is provided with a row of spaced openings 15.

The rake teeth 16 are formed from strips of stiff wire bent in U-shape to form spaced arms which pass through the openings 15 in the rake head and extend beyond the side edges of the head, with the extending portions of the arms upon one side bent at an angle with relation to the extending portions of the arms upon the opposite side of the rake head.

It will of course be understood that while the above described construction of the rake head and teeth associated therewith is preferred a solid head having teeth formed integral therewith and arranged upon opposite sides thereof, may be employed if so desired.

Secured between the ends of the rake head is a bracket 17, said bracket being provided at one end with a hook 18 and at its other end with a hook 18' and between the said hooks upon one side with an ear 19 having an aperture 20 adapted to register with the opening in the eye 2 so that suitable fastening means may be passed through said openings to pivotally connect the rake head with the handle, said fastening means being designated in the drawing by the numeral 21.

A contractile spring 22 has one end connected with the hook 18 on the bracket 17 and its other end connected with the hook 3 on the handle, said spring holding the rake head and teeth associated therewith in an inclined position with relation to the handle 1 with the strip of material forming the rake head in contact with the stop shoulder 11 of the openings 8.

To use the rake, the rake is held in the position shown in Fig. 2 in the drawing and the teeth engaged with the ground, so that as the handle is drawn toward the operator of the rake, the head will be moved to a position in the openings 8 against the influence of a spring 22 in which the teeth will assume the position as shown in Fig. 4 in the drawing. Should the teeth come in contact with roots, or other obstructions, the spring will permit the upper ends of the teeth to move toward the sleeve 4 so that the teeth will be prevented from becoming broken or bent. When the teeth have become clogged with material, the head is raised by means of the handle to release the teeth from contact with the ground at which time, the spring 22 moves the head to a position in the openings 8 in which the teeth assume a position as shown in Fig. 2 in the drawing. The handle 1 is now raised to the position shown in Fig. 3 in the drawing so that the teeth and head of the rake may be slid over the ground to remove the accumulated material from between the teeth. When this has been accomplished, the handle may be moved to a position shown in Fig. 2 in the drawing at which time, the teeth may be engaged with the ground and the raking operation completed.

If the occasion should require that the head of the rake be reversed one end of the spring 22 is disconnected from the hook 18 at one end of the bracket and the set screw 5 in the sleeve loosened so that the handle 1 may be given a half revolution about the threaded shank of the screw eye 2. The end of the spring may now be connected with the other hook 18' on the bracket 17 and the set screw 5 tightened thus holding the teeth on the rake in the desired position. It will of course be understood that the tension of the spring 22 upon the rake head is regulated by the position of the hook 3 upon the handle 1.

From the above description taken in connection with the accompanying drawing, it will at once be apparent that a rake has been provided which is simple in construction, inexpensive of manufacture and highly efficient in use.

Having thus described the invention what is claimed as new is:—

1. In combination with a rake handle, a sleeve carried by said handle and provided with spaced arms having openings therein, a head pivotally connected with the handle and mounted to turn in said openings, a spring connected to said head and handle, and bearing shoulders formed by the side walls of said openings and adapted to limit the turning movement of the head under the influence of said spring.

2. In a rake the combination with a handle, of a sleeve mounted upon the handle near one end thereof, arms formed integral with said sleeve and extending beyond the same, said arms being provided in their ends with openings having top and bottom walls curved in opposite directions, a head pivotally connected to said handle between said arms and mounted to turn on said oppositely curved top and bottom walls, stop shoulders formed by the side walls of said openings between said oppositely curved top and bottom walls, and a spring connected with the rake head and handle and adapted to normally hold said head in contact with said shoulders.

In testimony whereof I affix my signature in presence of two witnesses.

ELDON M. REED.

Witnesses:
D. F. MOORE,
J. L. BROWNING.

Copies of this patent may be obtained for five cents each, by addressing the "Commissioner of Patents, Washington, D. C."